(12) United States Patent
Konishi

(10) Patent No.: US 12,098,693 B2
(45) Date of Patent: Sep. 24, 2024

(54) WORK VEHICLE

(71) Applicant: KUBOTA CORPORATION, Osaka (JP)

(72) Inventor: Tatsunori Konishi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/017,476

(22) PCT Filed: Jun. 25, 2021

(86) PCT No.: PCT/JP2021/024232
§ 371 (c)(1),
(2) Date: Jan. 23, 2023

(87) PCT Pub. No.: WO2022/024628
PCT Pub. Date: Feb. 3, 2022

(65) Prior Publication Data
US 2023/0272763 A1    Aug. 31, 2023

(30) Foreign Application Priority Data
Jul. 28, 2020 (JP) ................................ 2020-126932

(51) Int. Cl.
*F02M 35/04* (2006.01)
*F02M 35/08* (2006.01)
*F02M 35/16* (2006.01)

(52) U.S. Cl.
CPC .......... *F02M 35/048* (2013.01); *F02M 35/08* (2013.01); *F02M 35/164* (2013.01)

(58) Field of Classification Search
CPC .... F02M 35/048; F02M 35/08; F02M 35/164; F02M 35/04; B62D 49/00
See application file for complete search history.

(56) References Cited

U.S. PATENT DOCUMENTS

2008/0168904 A1    7/2008   Oka et al.
2013/0327582 A1   12/2013   Kim

FOREIGN PATENT DOCUMENTS

| CN | 206111393   | 4/2017 |
| CN | 209100171 U | 7/2019 |
| EP | 2 679 448 A2 | 1/2014 |
| EP | 3 591 211 A2 | 1/2020 |
| JP | 57-32518    | 2/1982 |

(Continued)

OTHER PUBLICATIONS

International Search Report issued in International Bureau of WIPO Patent Application No. PCT/JP2021/024232, dated Aug. 24, 2021, along with an English translation thereof.

(Continued)

*Primary Examiner* — Jacob M Amick
*Assistant Examiner* — Charles J Brauch
(74) *Attorney, Agent, or Firm* — Greenblum & Bernstein, P.L.C.

(57) ABSTRACT

An air cleaner device that is positioned forward of a radiator, has a bottom surface inclined backward and upward to face the radiator side, and purifies air sent to an engine, and a discharge pipe that is disposed to extend from the bottom surface of the air cleaner device to the lower portion of the radiator and discharges dust separated by the air cleaner device are included.

11 Claims, 8 Drawing Sheets

(56) References Cited

FOREIGN PATENT DOCUMENTS

| JP | 3-17264 U | | 2/1991 |
|---|---|---|---|
| JP | 2002-89380 A | | 3/2002 |
| JP | 2005-271719 A | | 10/2005 |
| JP | 2005-330826 A | | 12/2005 |
| JP | 2018189054 A | * | 11/2018 |
| JP | 2019-217811 A | | 12/2019 |
| KR | 10-2016-0089212 A | | 7/2016 |

OTHER PUBLICATIONS

Written Opinion issued in International Bureau of WIPO Patent Application No. PCT/JP2021/024232, dated Aug. 24, 2021, along with an English translation thereof.
Extended European Search Report Issued in Corresponding EP Patent Application No. 21850551.9, dated Jun. 7, 2024.

* cited by examiner

WORK VEHICLE

TECHNICAL FIELD

The present invention relates to a technique of a working vehicle.

BACKGROUND ART

Conventionally, a technique of a working vehicle such as a tractor having an air cleaner device that purifies air sent to an engine is known. For example, Patent Literature 1 discloses such technique.

Patent Literature 1 describes a tractor in which an air cleaner that removes dust from taken outside air and feeds the air to an engine is provided in a space inside a hood.

There is a case where the air cleaner as described above is provided with a discharge pipe for discharging the dust separated from the air by the dust removing process to the outside.

However, in the case where the air cleaner is provided with such a discharge pipe, the air cleaner and the discharge pipe need to be accommodated in a limited space in the hood. Therefore, it is desired to achieve space saving of the air cleaner and the discharge pipe.

CITATION LIST

Patent Literature

Patent Literature 1: JP 2019-217811 A

SUMMARY OF INVENTION

Technical Problem

The present invention has been made in view of the above circumstance, and an object of the present invention is to provide a working vehicle capable of achieving space saving of an air cleaner device and a discharge pipe.

Solution to Problem

The problem to be solved by the present invention is as described above, and means for solving the problem will be described below.

That is, the working vehicle of the present invention includes: an air cleaner device that is positioned forward of a radiator, has a bottom surface inclined backward and upward to face the radiator side, and purifies air sent to an engine; and a discharge pipe that is disposed to extend from a bottom surface of the air cleaner device to a lower portion of the radiator and discharges dust separated by the air cleaner device.

The air cleaner device includes a first air cleaner unit that separates dust contained in sucked air and discharges the dust through the discharge pipe, and a second air cleaner unit that purifies air separated from dust by the first air cleaner unit.

The discharge pipe includes a first pipe that is connected to the air cleaner device and has flexibility, and a second pipe that is connected to the first pipe and has a discharge port through which the dust is discharged.

The second pipe is formed of a metal material.

The first pipe includes a reduced-diameter portion that is reduced in diameter from the air cleaner device side toward the second pipe side.

The radiator includes a fan that sends air to the engine side, and a shroud that is disposed to cover the fan from radially outside and guides air to the fan, and a recess recessed radially outward is formed in a lower portion of the shroud to receive the second pipe.

An end part of the second pipe that includes the discharge port is disposed to extend in parallel with a rotation shaft of the fan.

Advantageous Effects of Invention

The working vehicle according to an embodiment of the present invention can achieve space saving of the air cleaner device and the discharge pipe.

The working vehicle according to an embodiment of the present invention can perform effective air purification.

The working vehicle according to an embodiment of the present invention can improve maintainability of the discharge pipe.

The working vehicle according to an embodiment of the present invention can make it easy to fix the second pipe.

The working vehicle according to an embodiment of the present invention can achieve space saving while facilitating suction of air from the air cleaner device.

The working vehicle according to an embodiment of the present invention can make it easy to discharge dust separated by the first air cleaner unit.

The working vehicle according to an embodiment of the present invention makes it easy to suck dust in the discharge pipe by a suction force of the fan.

DESCRIPTION OF EMBODIMENTS

Figure 1:
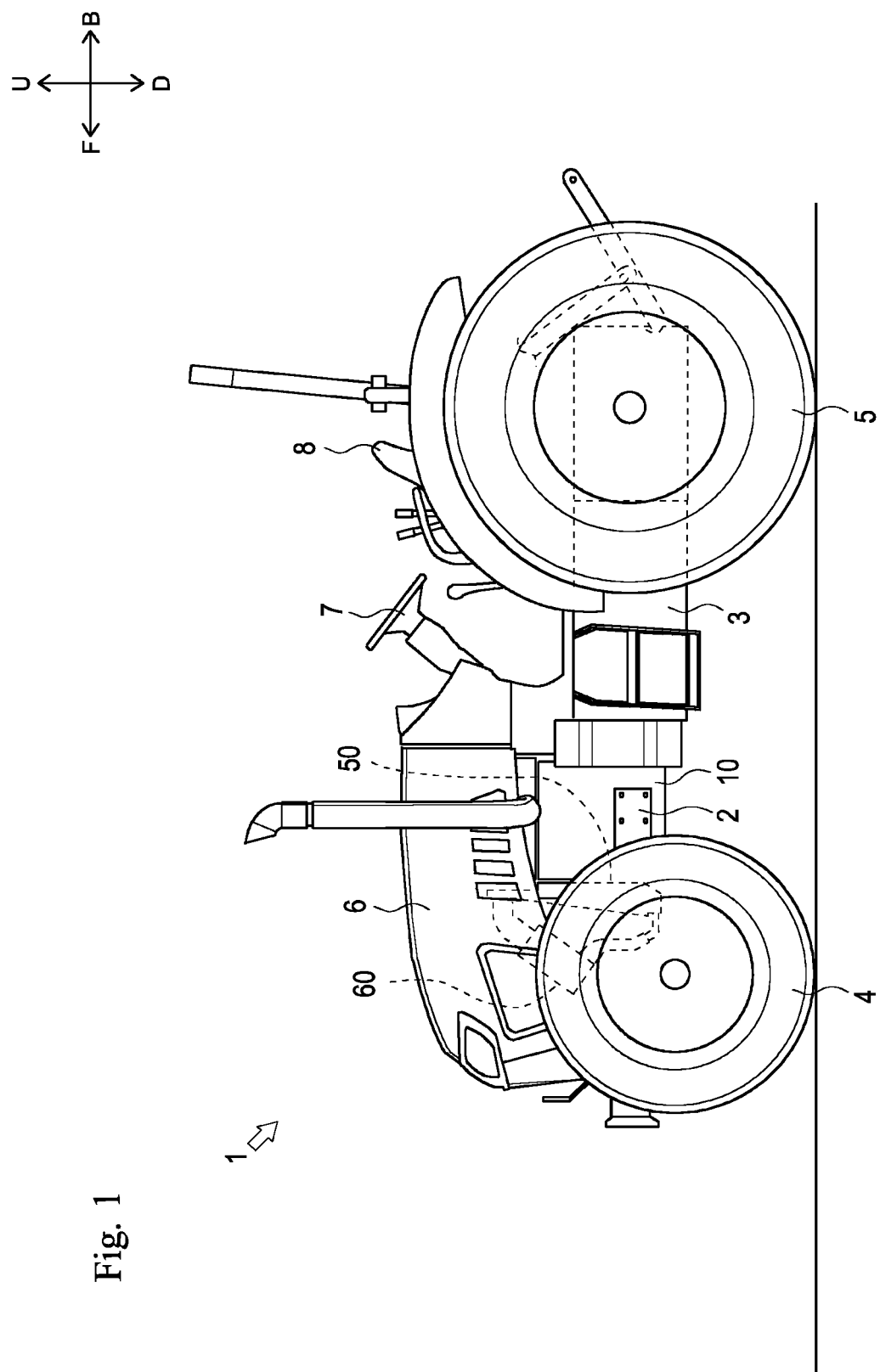
FIG. 1 is a side view showing an overall configuration of a tractor according to a first embodiment of the present invention.

In the following, description will be given with directions indicated by arrows U, D, F, B, L, and R in the drawings defined as an upward direction, a downward direction, a forward direction, a backward direction, a leftward direction, and a rightward direction, respectively.

An overall configuration of a tractor 1 according to the first embodiment of the present invention will be described below with reference to FIG. 1.

The tractor 1 mainly includes a front frame 2, a transmission case 3, a front wheel 4, a rear wheel 5, a hood 6, a steering wheel 7, a seat 8, and an engine 10.

The front frame 2 is a frame-shaped member formed by appropriately combining a plurality of panel members. The front frame 2 is disposed at a front lower portion of the tractor 1 with its longitudinal direction facing in the front-back direction. The engine 10 is fixed to a back part of the front frame 2. The transmission case 3 is fixed to a back part of the engine 10.

The front part of the front frame 2 is supported by the pair of left and right front wheels 4 through a front axle mechanism (not shown). The transmission case 3 is supported by the pair of left and right rear wheels 5 through a rear axle mechanism (not shown).

The engine 10 is covered with the hood 6. The steering wheel 7, the seat 8, various operation tools, a pedal, and the like are disposed backward of the hood 6.

After shifted by a transmission device (not shown) housed in the transmission case 3, power of the engine 10 can be transmitted to the front wheels 4 via the front axle mechanism and can be transmitted to the rear wheels 5 via the rear axle mechanism. In this manner, the front wheels 4 and the rear wheels 5 are rotationally driven by the power of the engine 10, and the tractor 1 can travel.

Next, the disposition of each member inside the hood 6 (engine room) will be described with reference to FIGS. 1 to 4.

The engine 10, a bottom part 20, a support portion 30, a battery 40, a radiator 50, an air cleaner device 60, a discharge pipe 70, and a feed pipe 80 are disposed inside the hood 6.

As shown in FIG. 1, the engine 10 is disposed a back part of the hood 6. The engine 10 is supported by the front frame 2.

Figure 2:
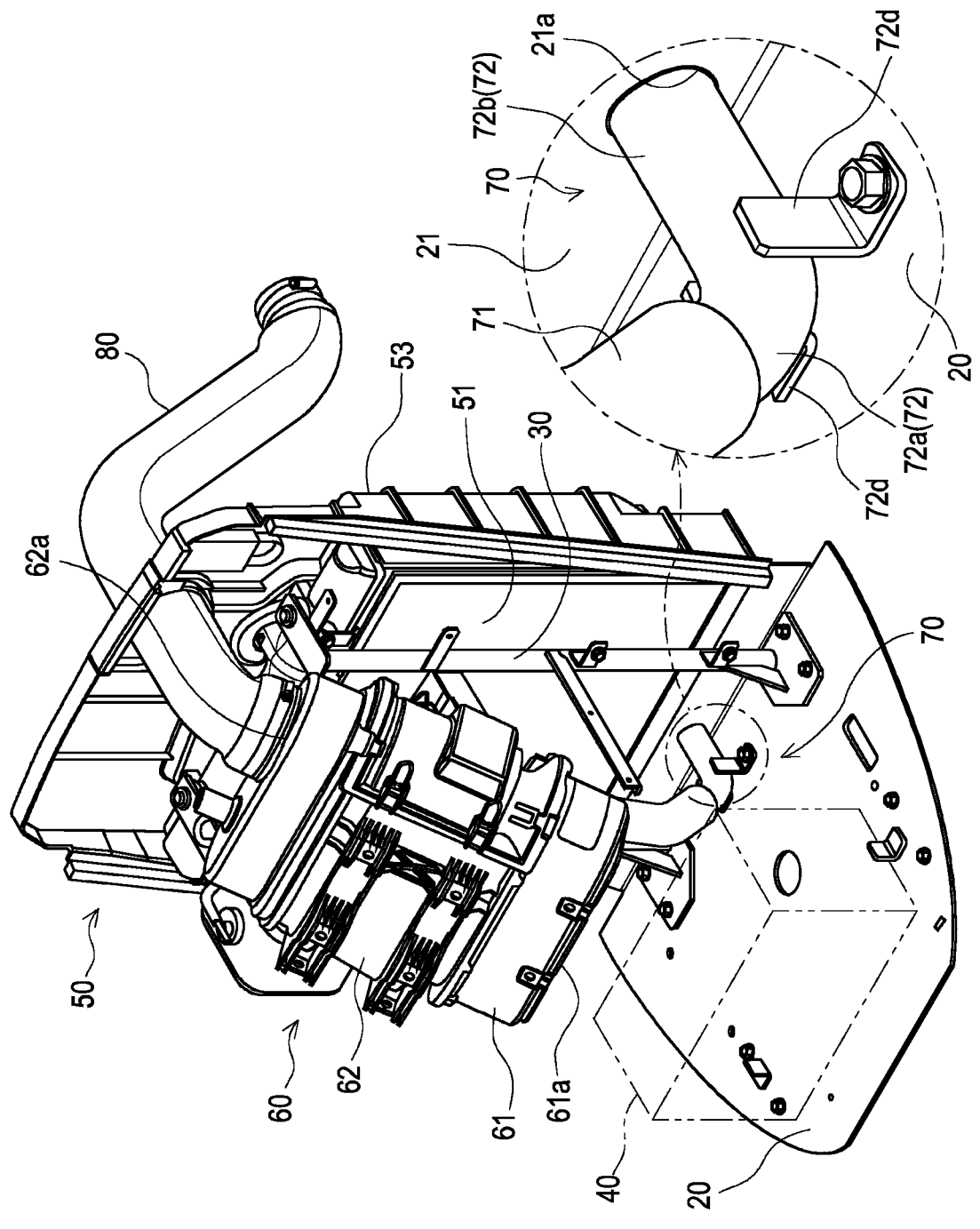
FIG. 2 is a perspective view showing each member in a hood of the tractor.
Figure 3:
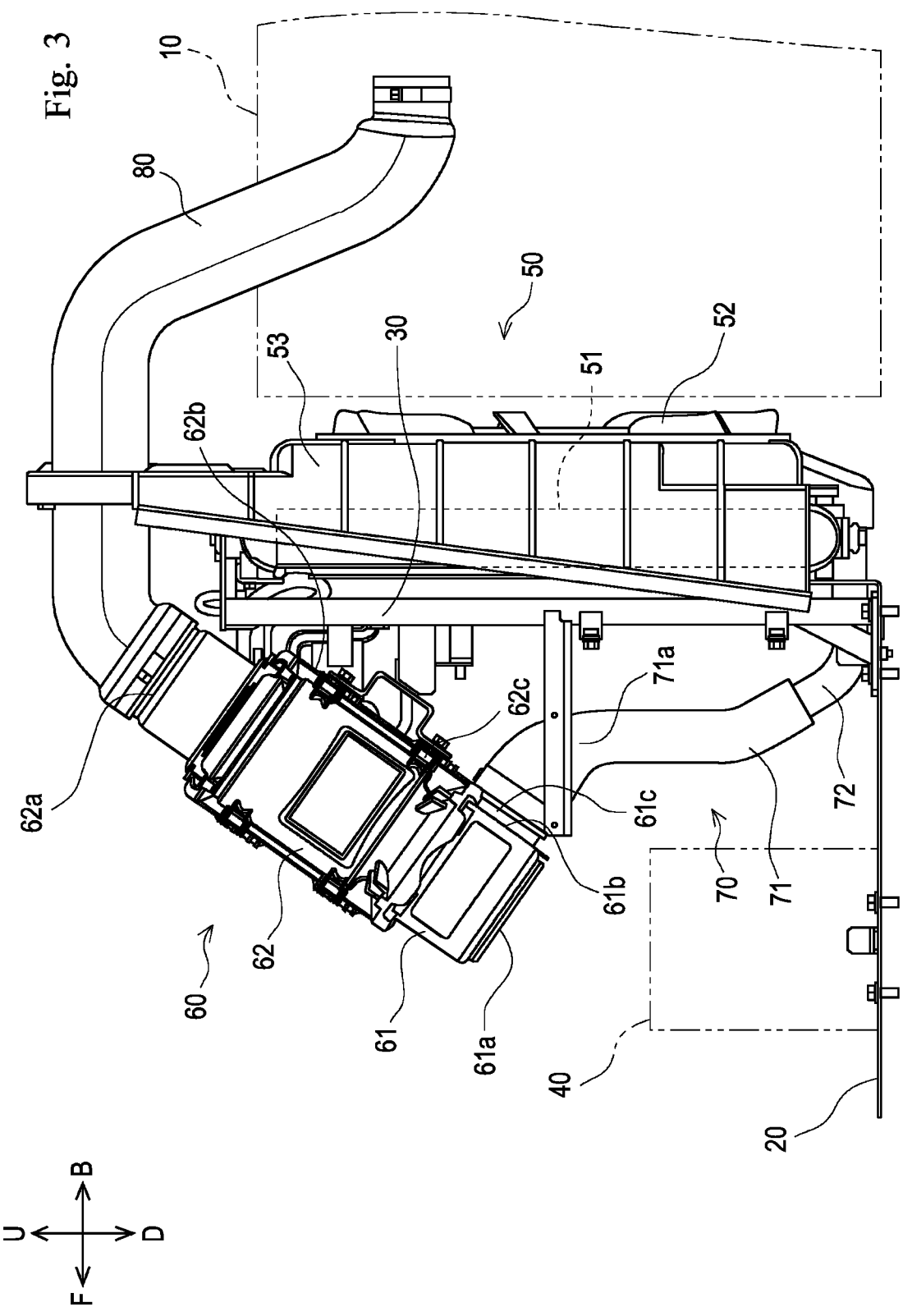
FIG. 3 is a side view showing each member in the hood of the tractor.
Figure 7:
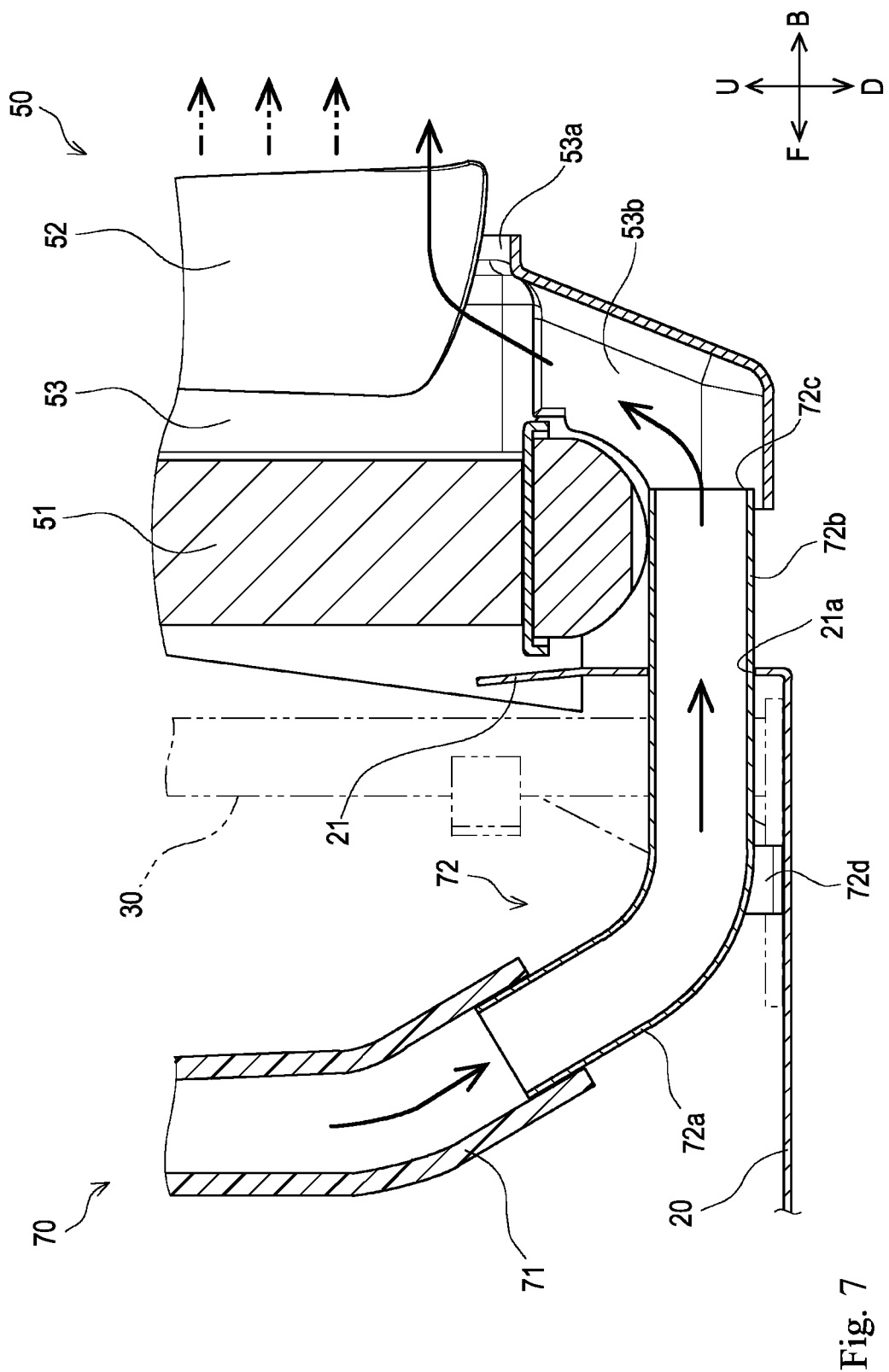
FIG. 7 is a side sectional view showing the radiator and a discharge pipe.

The bottom part 20 shown in FIGS. 2, 3, and 7 constitutes a bottom part of a front part of the engine room. The bottom part 20 is formed in a substantially panel shape with the thickness direction facing in the up-down direction. The bottom part 20 is disposed forward of the engine 10. The bottom part 20 is fixed to the front frame 2. The bottom part 20 includes a rising portion 21.

The rising portion 21 is a portion rising upward at a rear end part of the bottom part 20. The rising portion 21 is formed in a substantially panel shape with the thickness direction facing in the front-back direction. As shown in FIG. 7, the rising portion 21 covers an up-down gap between an upper surface of the bottom part 20 (an upper surface of a portion excluding the rising portion 21) and a lower end part of a core 51 of the radiator 50 described later. The rising portion 21 includes a hole part 21a.

The hole part 21a shown in FIGS. 2 and 7 penetrates the rising portion 21 in the front-back direction. The hole part 21a is formed in a substantially circular shape as viewed in the front-back direction. A second part 72b of a second pipe 72 described later is inserted into the rising portion 21.

The support portion 30 shown in FIGS. 2 and 3 supports the radiator 50 and the air cleaner device 60 described later. The support portion 30 is formed in a substantially rectangular frame shape as viewed in the front-back direction. The support portion 30 is formed by appropriately combining long members (frames) having a panel shape or a rod shape. The support portion 30 is fixed to the upper surface of a back part of the bottom part 20.

The battery 40 shown in FIGS. 2 and 3 is capable of charging and discharging electric power used in the tractor 1 such as starting the engine 10. The battery 40 is disposed forward of the support portion 30. The battery 40 is fixed to the upper surface of the bottom part 20.

The radiator 50 shown in FIGS. 2 to 5 is for cooling the cooling water of the engine 10. The radiator 50 is disposed forward of the engine 10. The radiator 50 is fixed to the support portion 30 through an appropriate member. The radiator 50 includes the core 51, a fan 52, and a shroud 53.

The core 51 shown in FIGS. 2 and 3 is for performing heat exchange between the cooling water of the engine 10 and the air circulating through the hood 6. The core 51 is disposed forward of the engine 10. The core 51 is disposed backward of the bottom part 20. As shown in FIG. 7, the lower end part of the core 51 is positioned lower than the upper end part of the rising portion 21 of the bottom part 20. The core 51 is connected to a water jacket (not shown) of the engine 10 through an appropriate hose or the like.

Figure 4:
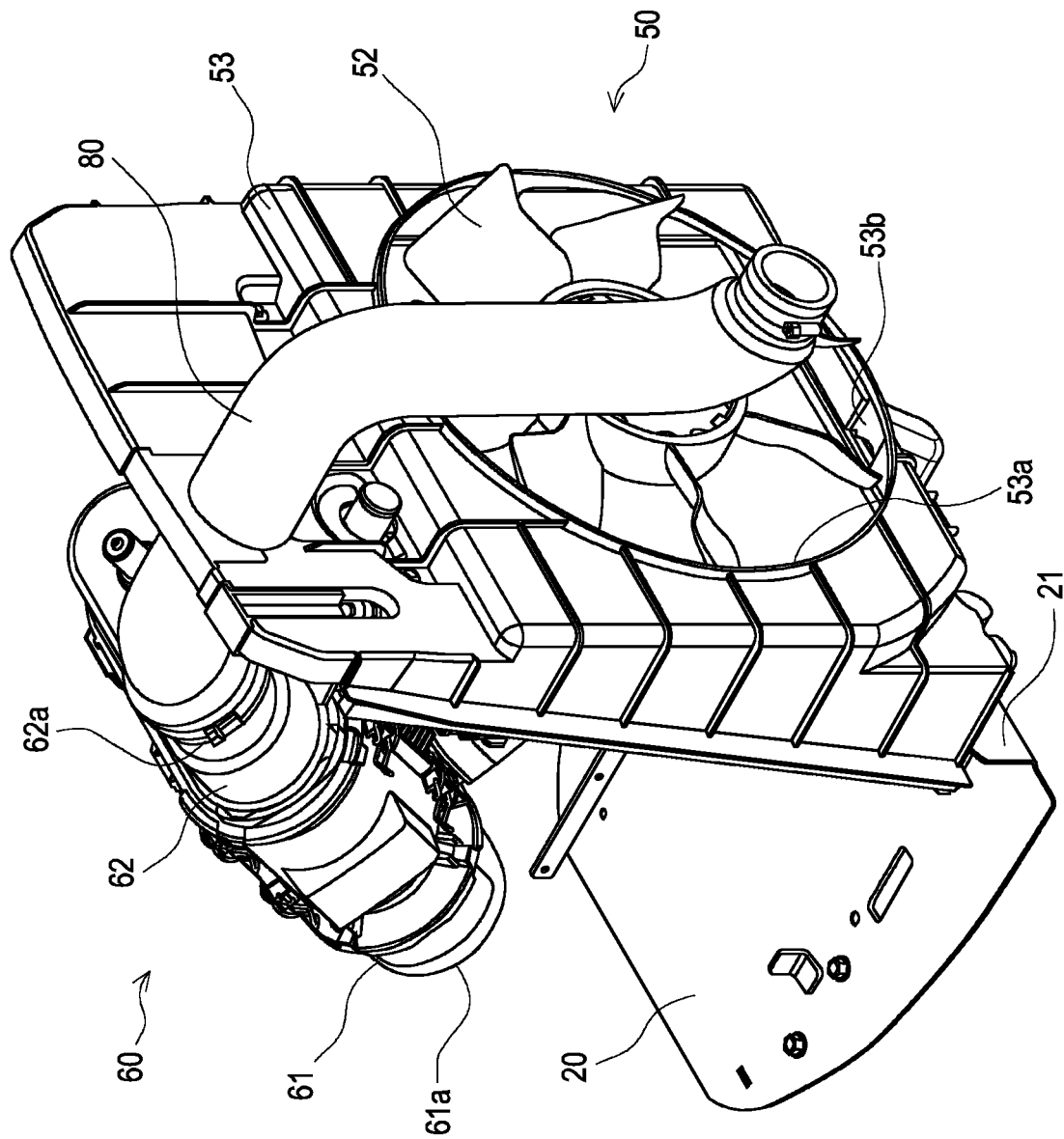
FIG. 4 is a perspective view of each member in the hood of the tractor as viewed from back.
Figure 5:
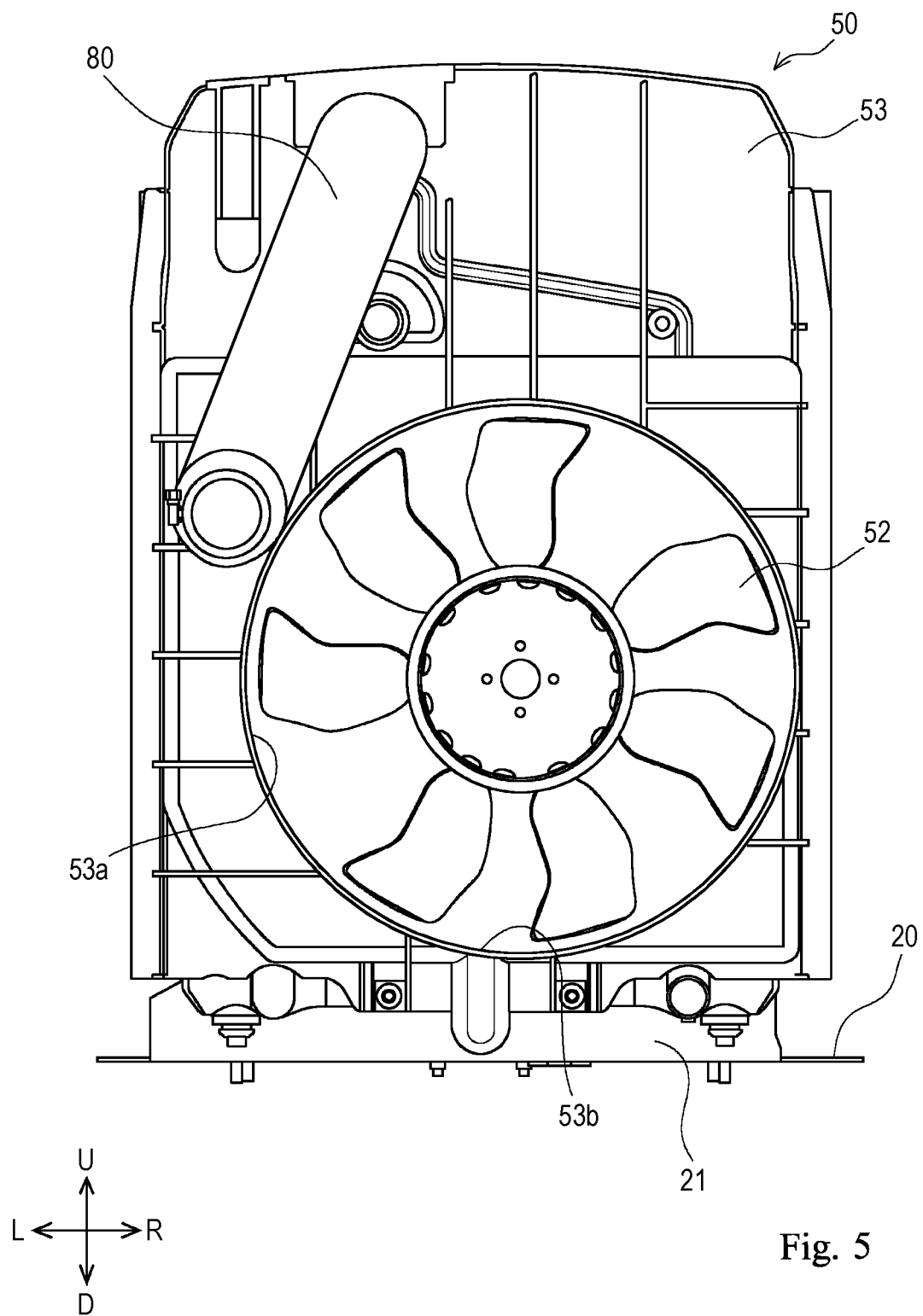
FIG. 5 is a rear view showing a radiator.

The fan 52 shown in FIGS. 4 and 5 sends (sucks) air backward. The fan 52 is disposed backward of the core 51 so as to oppose the rear surface of the core 51. The fan 52 is provided rotatably about an axis of a rotation shaft facing the front-back direction. The fan 52 is driven by transmission of power from the engine 10 through a shaft (not shown) of the engine 10.

The shroud 53 shown in FIGS. 3 to 6 is for guiding air to the fan 52. The shroud 53 is formed in a substantially box shape opening in the front-back direction. The shroud 53 is disposed so as to cover the core 51 and the fan 52 from radially outside. The shroud 53 includes an opening 53a and a recess 53b.

The opening 53a is a portion that penetrates the rear surface of the shroud 53 and opens backward. The opening 53a is formed in a substantially circular shape in rear view. The opening 53a is formed at a position lower than the central part of the shroud 53 in the up-down direction. As shown in FIGS. 4 and 5, the fan 52 is disposed inside the opening 53a. In this manner, the fan 52 is covered by the opening 53a of the shroud 53 from radially outside. The inner diameter of the opening 53a is formed to be slightly larger than the outer diameter of the fan 52. As shown in FIGS. 5 and 7, the inner surface of the opening 53a is close to an outer periphery part of the fan 52.

Figure 6:
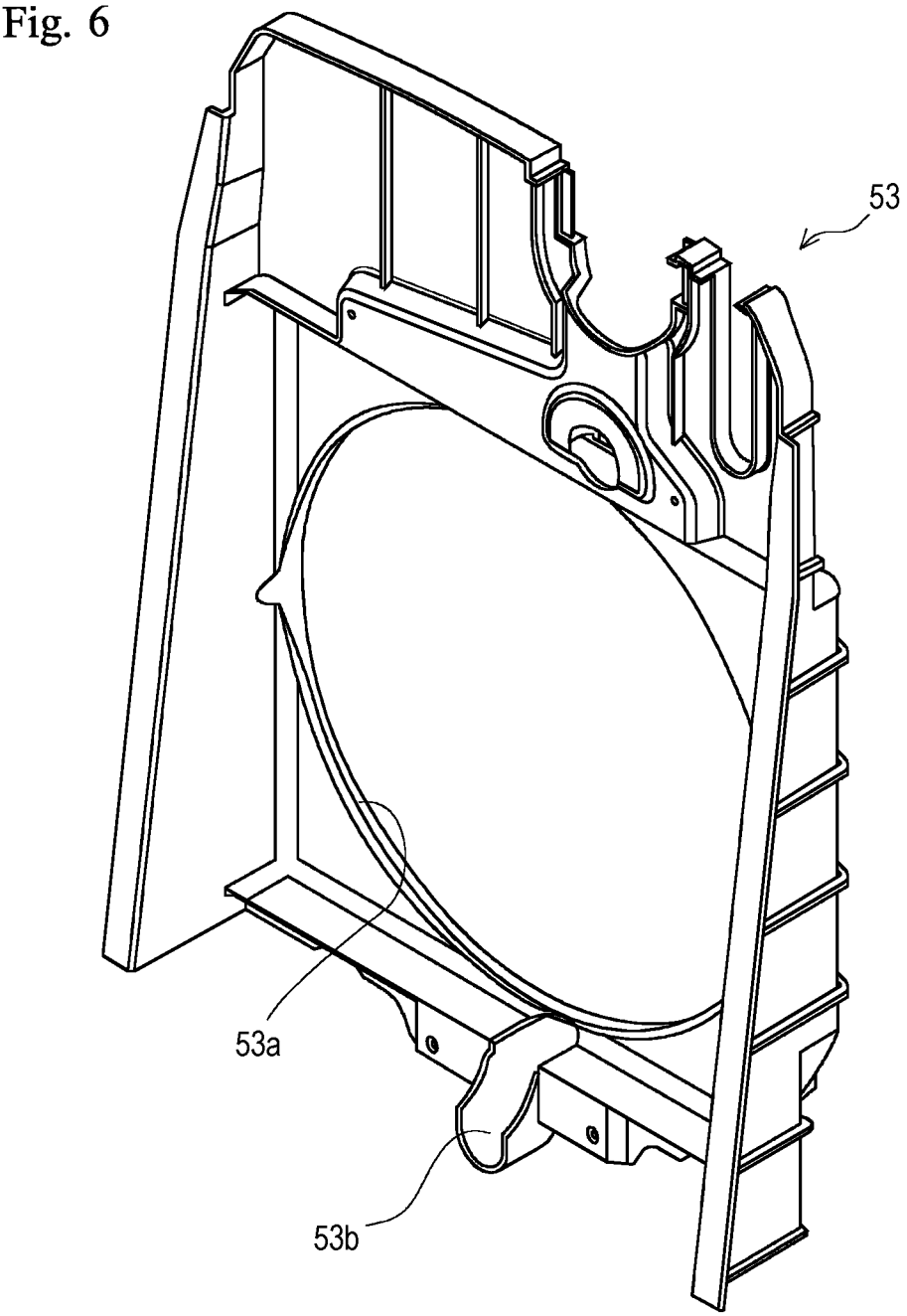
FIG. 6 is a perspective view showing a shroud.

The recess 53b shown in FIGS. 6 and 7 is recessed radially outward (downward) at a lower end part of the opening 53a. The recess 53b receives the second pipe 72 of the discharge pipe 70 described later. The recess 53b is formed in a substantially box shape opening upward and forward. As shown in FIG. 7, the bottom surface of the recess 53b is formed in a shape extending in the front-back direction. The rear surface of the recess 53b is formed in a shape inclined backward and upward. A suction force by driving of the fan 52 is applied to the inside of the recess 53b.

In the radiator 50 configured as described above, the fan 52 is driven by the driving of the engine 10. Due to this, the fan 52 sucks air forward of the core 51 (air circulating through the hood 6), causes the air to pass through the core 51, and sends the passed air backward. The core 51 cools the cooling water by performing heat exchange between the air sucked by the fan 52 and the cooling water. Thus, in the present embodiment, the front surface of the radiator 50 (core 51) is formed as an air introduction surface. The radiator 50 according to the present embodiment is configured to also suck air in the discharge pipe 70 of the air cleaner device 60 described later.

The air cleaner device 60 shown in FIGS. 2 to 4 takes in air sent to the engine 10 and purifies the air. The air cleaner device 60 is disposed to position forward of the radiator 50. The air cleaner device 60 is formed in a substantially rectangular parallelepiped shape that is long in one direction (oblique front-back direction in the present embodiment).

The air cleaner device 60 takes in air from a front surface facing forward and downward (a surface on which a sucking portion 61a described later is formed). The air cleaner device 60 discharges purified air from a rear surface facing backward and upward (a surface on which a feed pipe connection part 62a described later is formed). The air cleaner device 60 has a bottom surface (a bottom surface 61b and a bottom surface 62b described later) that is positioned between the front surface and the rear surface and constitutes the bottom of the air cleaner device 60. The bottom surface has a larger area than that of the front surface and the rear surface.

The air cleaner device 60 is disposed in a state of being inclined backward and upward such that the bottom surface (the bottom surface 61b and the bottom surface 62b) faces the radiator 50 side (obliquely rear lower side). In other words, the air cleaner device 60 is disposed such that the longitudinal direction faces the oblique front-back direction. The air cleaner device 60 includes a pre-cleaner unit 61 and a main air cleaner unit 62.

The pre-cleaner unit 61 removes dust from sucked air. The pre-cleaner unit 61 constitutes a front part of the air cleaner device 60. The pre-cleaner unit 61 separates dust contained in taken air and discharges the dust. The air separated from the dust by the pre-cleaner unit 61 is fed to a rear side (the main air cleaner unit 62 side described later).

As the pre-cleaner unit 61, a cyclone type is employed in which centrifugal force is applied by turning air taken inside into a spiral air flow to separate dust contained in the air. The pre-cleaner unit 61 includes the sucking portion 61a and the bottom surface 61b.

The sucking portion 61a shown in FIGS. 2 and 3 is a portion that sucks air (takes in air). The sucking portion 61a is provided on a front surface (a surface facing obliquely front lower side) of the pre-cleaner unit 61. The sucking portion 61a is formed on the front surface of the pre-cleaner unit 61 so as to communicate with the inside of the pre-cleaner unit 61.

The bottom surface 61b shown in FIG. 3 is a surface inclined backward and upward so as to face the radiator 50 side (obliquely rear lower side) of the pre-cleaner unit 61. The bottom surface 61b includes a discharge pipe connection part 61c.

The discharge pipe connection part 61c is a part to which the discharge pipe 70 described later is connected. The discharge pipe connection part 61c is formed by penetrating the bottom surface 61b, and opens to the radiator 50 side (obliquely rear lower side). Dust separated from air inside the pre-cleaner unit 61 is discharged through the discharge pipe connection part 61c.

The main air cleaner unit 62 shown in FIGS. 2 to 4 purifies air by further removing dust from air separated (removed) from dust by the pre-cleaner unit 61. The main air cleaner unit 62 constitutes a part of the air cleaner device 60 backward relative to the pre-cleaner unit 61. The main air cleaner unit 62 has a front end part connected to a rear end part of the pre-cleaner unit 61. The air purified by the main air cleaner unit 62 is fed to the engine 10 through the feed pipe 80 described later.

The main air cleaner unit 62 causes air fed from the pre-cleaner unit 61 to pass through a built-in filter (not shown) to purify the air. The main air cleaner unit 62 includes the feed pipe connection part 62a and the bottom surface 62b.

The feed pipe connection part 62a shown in FIGS. 2 and 3 is a portion to which the feed pipe 80 described later is connected. The feed pipe connection part 62a is formed by penetrating the rear surface (surface facing obliquely rear upper side) of the main air cleaner unit 62, and opens obliquely rear upper side. The air purified inside the main air cleaner unit 62 is discharged through the feed pipe connection part 62a.

The bottom surface 62b shown in FIG. 3 is a surface inclined upward and backward so as to face the radiator 50 side (obliquely rear lower side) of the main air cleaner unit 62. The bottom surface 62b includes a fixed part 62c.

The fixed part 62c is a part fixed to the support portion 30. The fixed part 62c is fixed to the support portion 30 through an appropriate fastener such as a bolt.

The discharge pipe 70 shown in FIGS. 2, 3, and 7 discharges dust separated by the pre-cleaner unit 61. The discharge pipe 70 is disposed so as to extend obliquely backward and downward from the bottom surface 61b of the pre-cleaner unit 61 to the lower portion (recess 53b) of the radiator 50. As shown in FIGS. 2 and 3, the discharge pipe 70 is disposed in a space (space between the radiator 50 and the battery 40) formed between the bottom surface (the bottom surface 61b and the bottom surface 62b) of the inclined air cleaner device 60 and the front surface of the radiator 50. The discharge pipe 70 connects the discharge pipe connection part 61c of the pre-cleaner unit 61 and the recess 53b of the radiator 50. The discharge pipe 70 includes a first pipe 71 and a second pipe 72.

The first pipe 71 shown in FIG. 3 is a part connected to the discharge pipe connection part 61c of the pre-cleaner unit 61. The first pipe 71 is formed in a substantially cylindrical shape. The first pipe 71 has flexibility. As a material for forming the first pipe 71, for example, a material having flexibility such as resin (rubber) can be adopted. The first pipe 71 has an upper end part connected to the discharge pipe connection part 61c and a lower end part connected to the second pipe 72 described later. The first pipe 71 includes a reduced-diameter portion 71a.

The reduced-diameter portion 71a is a part that is reduced in diameter from an upstream side of the first pipe 71 (discharge pipe connection part 61c side) toward a downstream side (second pipe 72 side). The reduced-diameter portion 71a is formed such that the flow path area gradually decreases from the upstream side toward the downstream side. In the shown example, an example is shown in which the reduced-diameter portion 71a is positioned at an upper portion of the first pipe 71 (in the vicinity of the discharge pipe connection part 61c).

As shown in FIG. 3, the first pipe 71 is formed to be bent such that an upper portion (reduced-diameter portion 71a) extends obliquely backward and downward from the pre-cleaner unit 61, a middle portion in the up-down direction extends downward (vertical direction), and a lower portion extends obliquely backward and downward toward the second pipe 72.

The second pipe 72 shown in FIGS. 2 and 7 is a part detachably connected to the first pipe 71. The second pipe 72 is formed in a substantially cylindrical shape extending in the front-back direction and having a front part bent obliquely upward. The second pipe 72 is formed of a metal material. The second pipe 72 connects the first pipe 71 and the recess 53b of the radiator 50. The second pipe 72 is fixed to the upper surface of the bottom part 20 through an appropriate member. The second pipe 72 includes a first part 72a, the second part 72b, and a fixing part 72d.

The first part 72a is a part connected to a lower end part of the first pipe 71. The first part 72a constitutes a front part of the first pipe 71. The first part 72a is formed in a shape extending obliquely forward and upward direction.

The second part 72b is a part connected to the recess 53b of the radiator 50. The second part 72b constitutes a back part of the second pipe 72. The second part 72b is formed in a shape extending in the front-back direction. That is, the second part 72b extends in parallel with the rotation shaft of the fan 52. As shown in FIGS. 2 and 7, the second part 72b is inserted through the hole part 21a of the rising portion 21. A rear end part of the second part 72b is received inside the recess 53b. The second part 72b includes a discharge port 72c.

The discharge port 72c is a part that opens at the rear end part of the second part 72b. The second pipe 72 communicates with the recess 53b through the discharge port 72c.

The fixing part 72d shown in FIG. 2 is a part fixed to the bottom part 20. The fixing part 72d is formed in a shape in which a panel-shaped member is bent into a substantially L shape. A pair of the fixing parts 72d are provided so as to be positioned on both sides of the second part 72b in the left-right direction. In the present embodiment, the fixing part 72d has one piece part in a substantially L shape fixed to the second part 72b by welding, and the other piece part fixed to the bottom part 20 by fastening using a fastener such as a bolt. The fixing mode using the fixing part 72d is not limited to the above-described example, and for example, the fixing part 72d may be fixed to the second part 72b by fastening and may be fixed to the bottom part 20 by welding.

The feed pipe 80 shown in FIGS. 2 and 3 feeds air purified by the main air cleaner unit 62 to the engine 10. The feed pipe 80 is formed in a substantially cylindrical shape extending substantially in the front-back direction. The feed pipe 80 has a front end part connected to the feed pipe connection part 62a and a rear end part connected to the engine 10. In the shown example, the feed pipe 80 is provided so as to penetrate an upper portion of the shroud 53 in the front-back direction.

Next, a situation in which the tractor 1 configured as described above feeds air to the engine 10 and discharges dust to the outside will be described.

When the engine 10 shown in FIG. 1 is driven, the engine 10 attempts to suck air through the air cleaner device 60 and the feed pipe 80. At this time, air circulating inside the hood 6 is introduced into the sucking portion 61a of the pre-cleaner unit 61 shown in FIGS. 2 and 3. The air is separated from dust inside the pre-cleaner unit 61.

The air separated from the dust is fed to the main air cleaner unit 62, and is further removed from dust and purified inside the main air cleaner unit 62. The purified air is sent to the engine 10 by circulating through the feed pipe 80. Due to this, the air purified by the pre-cleaner unit 61 and the main air cleaner unit 62 is fed to the engine 10. Thus, by purifying air at the main air cleaner unit 62 after separating dust at the pre-cleaner unit 61, it is possible to perform effectively air purification.

The dust separated from the air by the pre-cleaner unit 61 circulates through the discharge pipe 70 and moves downward. Here, as shown in FIG. 7, the second pipe 72 of the discharge pipe 70 is connected to the recess 53b of the shroud 53 of the radiator 50. With such configuration, the dust in the pre-cleaner unit 61 and the discharge pipe 70 is sucked by the suction force of the fan 52 of the radiator 50. This can make it easy to discharge the dust.

As shown in FIG. 7, the recess 53b is provided at the lower end part of the opening 53a (in the vicinity of the outer periphery part of the fan 52). Here, the suction force is relatively stronger on the outer periphery part side of the fan 52 than that on an inner periphery part side. In this manner, by providing the recess 53b in the vicinity of the outer periphery part of the fan 52 where the suction force is relatively strong, it is possible to more effectively suck the dust in the discharge pipe 70. In the present embodiment, the second part 72b of the second pipe 72 is disposed so as to extend in parallel with the rotation shaft of the fan 52. This can make it easy to suck the air in the second pipe 72 by the suction force of the fan 52, and therefore can make it easier to discharge the dust in the second pipe 72.

As shown in FIG. 7, dust discharged through the discharge port 72c of the second pipe 72 passes through the recess 53b, is sent backward by the fan 52, and is discharged to the outside of the tractor 1 through a gap of the hood 6 or the like.

Thus, the tractor 1 (working vehicle) according to the present embodiment includes: the air cleaner device 60 that is positioned forward of the radiator 50, has the bottom surface 61b inclined backward and upward to face the radiator 50 side, and purifies air sent to the engine 10; and the discharge pipe 70 that is disposed to extend from the bottom surface of the air cleaner device 60 to the lower portion of the radiator 50 and discharges dust separated by the air cleaner device 60.

Such configuration can achieve space saving of the air cleaner device 60 and the discharge pipe 70. That is, the discharge pipe 70 can be disposed using a space formed between the bottom surface 61b of the inclined air cleaner device 60 and the front surface of the radiator 50. This makes it possible to achieve space saving of the air cleaner device 60 and the discharge pipe 70, and effectively use the space inside the hood 6. By disposing the discharge pipe 70 so as to extend to the lower portion of the radiator 50, the dust discharge path faces downward. This makes it difficult for dust to clog inside the discharge pipe 70.

The air cleaner device 60 includes the pre-cleaner unit 61 (first air cleaner unit) that separates dust contained in sucked air and discharges the dust through the discharge pipe 70, and the main air cleaner unit 62 (second air cleaner unit) that purifies the air separated from the dust by the pre-cleaner unit 61 (first air cleaner unit).

Such configuration makes it possible to perform effective air purification. That is, effective air purification can be performed by separating dust at the pre-cleaner unit 61 (first air cleaner unit) and then purifying air in the main air cleaner unit 62 (second air cleaner unit).

The discharge pipe 70 includes the first pipe 71 that is connected to the air cleaner device 60 and has flexibility, and the second pipe 72 that is connected to the first pipe 71 and has the discharge port 72c through which the dust is discharged.

Such configuration makes it possible to improve maintainability of the discharge pipe 70. That is, attachment/detachment and cleaning of each unit can be performed while deforming the first pipe 71.

The second pipe 72 is formed of a metal material.

Such configuration makes it possible to easily fix the second pipe 72. That is, for example, in a case where the second pipe 72 is formed of a material such as resin having relatively low strength, it is necessary to use a member such as a washer or rubber in addition to a fastener such as a bolt when fixing the second pipe 72. For this reason, it is considered that the number of members increases and it takes time and effort to attach/detach the members, and maintainability is impaired. On the other hand, by forming the second pipe 72 with a metal material having relatively high strength, it is possible to fix the second pipe 72 by a relatively easy means such as fastening and welding. This makes it possible to improve maintainability.

The first pipe 71 includes the reduced-diameter portion 71a that is reduced in diameter from the air cleaner device 60 side toward the second pipe 72 side.

Such configuration can achieve space saving while making it easy to suck air from the air cleaner device 60. That is, space saving can be achieved by relatively increasing the flow path area to make it easy to suck air on the air cleaner device 60 side (discharge pipe connection part 61c side) of the first pipe 71, while reducing the diameter of the second pipe 72 side.

The radiator 50 includes the fan 52 that sends air to the engine 10 side, and the shroud 53 that is disposed to cover the fan 52 from radially outside and guides air to the fan 52, and the recess 53b recessed radially outward is formed in a lower portion of the shroud 53 to receive the second pipe 72.

Such configuration makes it possible to easily discharge the dust separated by the pre-cleaner unit 61 (first air cleaner unit). That is, the dust in the discharge pipe 70 becomes easily sucked by the suction force of the fan 52, and the dust can be easily discharged.

The end part of the second pipe 72 that includes the discharge port 72c is disposed to extend in parallel with the rotation shaft of the fan 52.

Such configuration makes it easy to suck dust in the discharge pipe 70 by the suction force of the fan 52.

The tractor 1 according to the present embodiment is an embodiment of the working vehicle according to the present invention.

The pre-cleaner unit 61 according to the present embodiment is an embodiment of the first air cleaner unit according to the present invention.

The main air cleaner unit 62 according to the present embodiment is an embodiment of the second air cleaner unit according to the present invention.

Although the first embodiment of the present invention has been described above, the present invention is not limited to the above configuration, and various modifications can be made within the scope of the invention described in the claims.

For example, the discharge pipe 70 is not limited to the above-described configuration, and may be a discharge pipe 70A according to the second embodiment described below.

Figure 8:
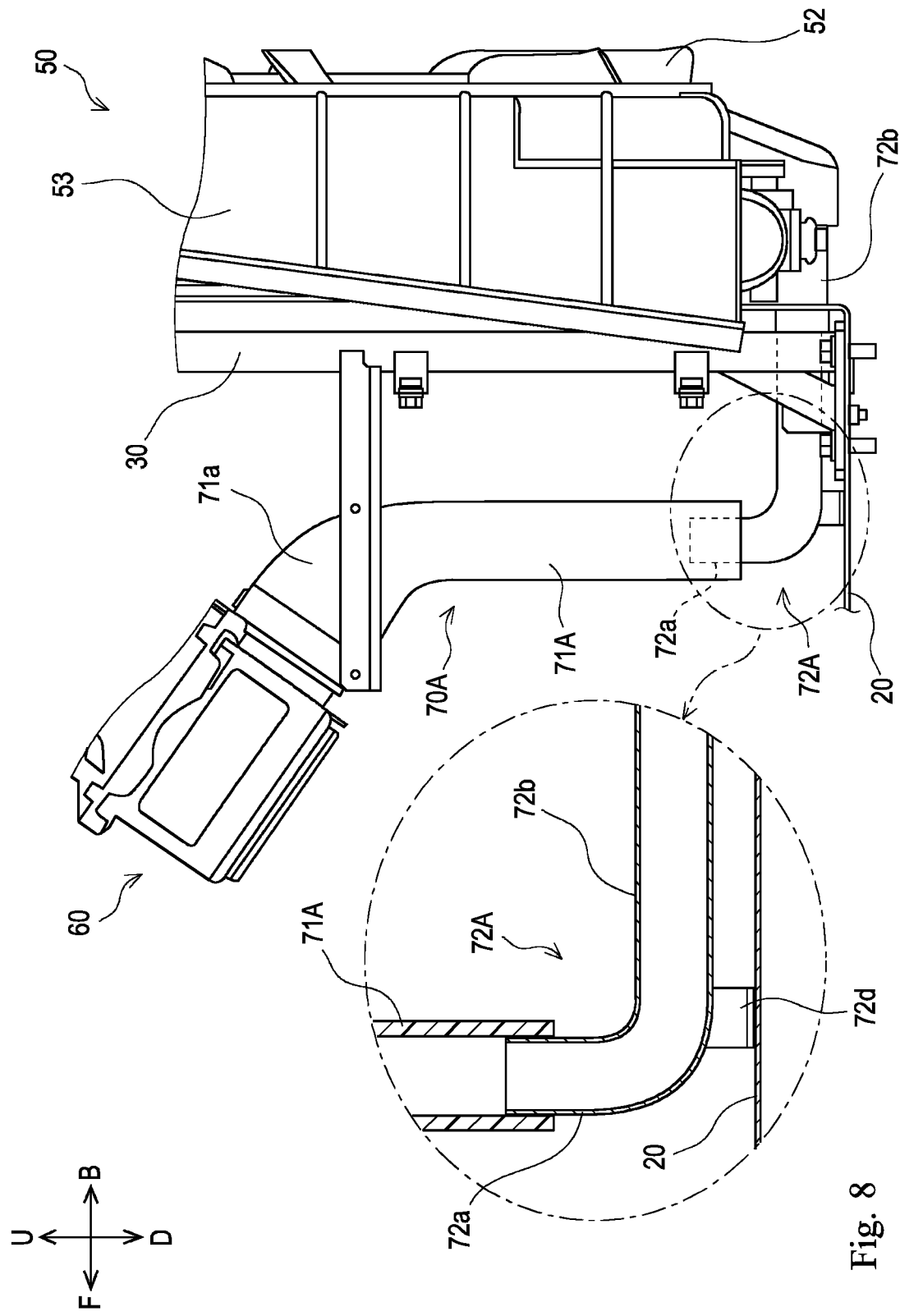
FIG. 8 is a side sectional view showing a radiator and a discharge pipe according to a second embodiment of the present invention.

The discharge pipe 70A shown in FIG. 8 is different in the configurations of a first pipe 71A and a second pipe 72A from the first pipe 71 and the second pipe 72 of the discharge pipe 70 according to the first embodiment.

As shown in FIG. 8, the first pipe 71A is bent such that an upper portion (reduced-diameter portion 71a) extends obliquely backward and downward from the pre-cleaner unit 61, and then a lower portion (part on the lower side relative to the reduced-diameter portion 71a) extends downward (vertical direction).

The second pipe 72A is formed in a shape in which the first part 72a extends upward. That is, the second pipe 72A is formed such that the first part 72a is bent at substantially a right angle with respect to the second part 72b extending in the front-back direction. The first part 72a is connected to a lower end part of the first pipe 71A extending in the vertical direction as described above.

According to the discharge pipe 70 as described above, since a lower portion of the first pipe 71A is formed to extend in the vertical direction (linearly), the lower portion can be easily bent front and back. Such configuration makes it possible to easily take the second pipe 72A in and out of the shroud 53 (recess 53b) in a state where the first pipe 71A and the second pipe 72A are connected. It is possible to easily attach/detach the first pipe 71A and the second pipe 72A.

Although each embodiment of the present invention has been described above, the present invention is not limited to the above configuration, and various modifications can be made within the scope of the invention described in the claims.

For example, in the above embodiment, the cyclone type pre-cleaner unit 61 has been described as an example, but the present invention is not limited to such a mode. As the pre-cleaner unit 61, various configurations capable of separating dust contained in air can be adopted.

In the above embodiment, an example in which the main air cleaner unit 62 is configured to purify air by allowing the air to pass through the built-in filter has been described, but the present invention is not limited to such a mode. As the main air cleaner unit 62, various configurations capable of purifying air can be adopted.

In the above embodiment, an example in which the second pipe 72 is fixed to the bottom part 20 by welding or fastening has been described, but the present invention is not limited to such a mode. As a fixing mode of the second pipe 72, various other methods can be adopted.

In the above embodiment, an example in which the second pipe 72 is fixed to the bottom part 20 has been described, but the present invention is not limited to such a mode. As a fixing target of the second pipe 72, various other places can be adopted.

In the above embodiment, the tractor 1 has been exemplified as the working vehicle, but the working vehicle is not limited to such a mode. For example, the working vehicle may be other agricultural vehicles, construction vehicles, industrial vehicles, and the like.

INDUSTRIAL APPLICABILITY

The present invention is applicable to a working vehicle.

REFERENCE SIGNS LIST

1: Tractor
50: Radiator
52: Fan
53: Shroud
53b: Recess
60: Air cleaner device
61: Pre-cleaner unit
62: Main air cleaner unit
70, 70A: Discharge pipe
71, 71A: First pipe
72, 72A: Second pipe
72c: Discharge port

The invention claimed is:

1. A working vehicle comprising:
an air cleaner device that is positioned forward of a radiator, has a bottom surface inclined backward and upward to face the radiator side, and purifies air sent to an engine; and
a discharge pipe that is disposed to extend from a bottom surface of the air cleaner device to a lower portion of the radiator and discharges dust separated by the air cleaner device, wherein
the discharge pipe includes
a first pipe that is connected to the air cleaner device and has flexibility, and a second pipe that is connected to the first pipe and has a discharge port through which the dust is discharged.

2. The working vehicle according to claim 1, wherein the air cleaner device includes
a first air cleaner unit that separates dust contained in sucked air and discharges the dust through the discharge pipe, and
a second air cleaner unit that purifies air separated from dust by the first air cleaner unit.

3. The working vehicle according to claim 1, wherein the second pipe is formed of a metal material.

4. The working vehicle according to claim 1, wherein the first pipe includes a reduced-diameter portion that is reduced in diameter from the air cleaner device side toward the second pipe side.

5. The working vehicle according to claim 1, wherein the radiator includes
a fan that sends air to the engine side, and
a shroud that is disposed to cover the fan from radially outside and guides air to the fan, and
a recess recessed radially outward is formed in a lower portion of the shroud to receive the second pipe.

6. The working vehicle according to claim 5, wherein an end part of the second pipe that includes the discharge port is disposed to extend in parallel with a rotation shaft of the fan.

7. The working vehicle according to claim 1, wherein
the working vehicle further comprises a bottom portion of a front part of an engine room, the bottom portion being disposed forward to the engine and fixed to a front frame,
the bottom portion includes a rising portion rising upward at a rear end part of the bottom portion,
the rising portion being configured to cover a vertical gap between an upper surface of the bottom portion and a lower end portion of the radiator, and
the second pipe is inserted into the rising portion.

8. The working vehicle according to claim 1, wherein the discharge pipe is configured to extend obliquely backward and downward from the bottom surface of the air cleaner device to the lower portion of the radiator.

9. The working vehicle according to claim 1, wherein the first pipe includes:
an upper portion configured to extend obliquely backward and downward from the air cleaner device,
a middle portion configured to extend vertically downward, and
a lower portion configured to extend obliquely backward and downward towards the second pipe.

10. The working vehicle according to claim 7, wherein the second pipe includes:
a first portion configured to connect to the lower portion of the first pipe,
a second portion configured to connect to a recess of the radiator and extend parallel with a rotation shaft of a fan included in the radiator, and
a fixing portion configured to fix the second pipe to the bottom portion.

11. The working vehicle according to claim 5, wherein
the second pipe is configured to connect to a recess of the shroud, and
the recess is provided at a lower end part of an opening, the opening being a portion that penetrates a rear surface of the shroud and opens backward.

* * * * *